United States Patent
Nakanishi et al.

(10) Patent No.: US 10,204,043 B2
(45) Date of Patent: Feb. 12, 2019

(54) MEMORY CONTROLLER, METHOD OF CONTROLLING NONVOLATILE MEMORY AND MEMORY SYSTEM

(71) Applicant: Toshiba Memory Corporation, Minato-ku, Tokyo (JP)

(72) Inventors: Keiri Nakanishi, Kanagawa (JP); Sho Kodama, Kanagawa (JP); Kohei Oikawa, Kanagawa (JP); Kojiro Suzuki, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 185 days.

(21) Appl. No.: 15/422,100

(22) Filed: Feb. 1, 2017

(65) Prior Publication Data
US 2017/0262212 A1 Sep. 14, 2017

Related U.S. Application Data

(60) Provisional application No. 62/305,485, filed on Mar. 8, 2016.

(51) Int. Cl.
*G06F 12/00* (2006.01)
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0619* (2013.01); *G06F 3/0679* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 7,751,237 B2 | 7/2010 | Alrod et al. | |
| 7,768,844 B2 | 8/2010 | Takase et al. | |
| 7,791,938 B2 | 9/2010 | Kang et al. | |
| 8,015,370 B2 | 9/2011 | Furuichi et al. | |
| 8,140,744 B2 * | 3/2012 | Gaertner | G11B 20/00007 711/112 |
| 8,380,915 B2 | 2/2013 | Wood et al. | |

(Continued)

FOREIGN PATENT DOCUMENTS

| | | |
|---|---|---|
| JP | 4660520 B2 | 3/2011 |
| JP | 5028577 B2 | 9/2012 |

(Continued)

OTHER PUBLICATIONS

Amit Berman, et al., "Mitigating Inter-Cell Coupling Effects in MLC NAND Flash via Constrained Coding", Flash Memory Summit 2010.

*Primary Examiner* — Baboucarr Faal
(74) *Attorney, Agent, or Firm* — Holtz, Holtz & Volek PC

(57) ABSTRACT

According to one embodiment, a memory controller includes a compression unit and a padding processing unit. The compression unit generates first compressed data and second compressed data by compressing first data and second data. The padding processing unit pads first padding data for the first compressed data in accordance with a first padding pattern and pads second padding data for the second compressed data in accordance with a second padding pattern.

20 Claims, 18 Drawing Sheets

(56) References Cited

U.S. PATENT DOCUMENTS

| | | |
|---|---|---|
| 8,508,989 B2 | 8/2013 | Alrod et al. |
| 8,949,516 B2 | 2/2015 | Miura |
| 2007/0195597 A1 | 8/2007 | Park et al. |
| 2014/0229131 A1 | 8/2014 | Cohen et al. |
| 2015/0082125 A1 | 3/2015 | Miura |
| 2016/0342494 A1* | 11/2016 | Yang .................. G11C 16/3404 |
| 2017/0171363 A1* | 6/2017 | Sun .......................... H04L 1/004 |

FOREIGN PATENT DOCUMENTS

| | | |
|---|---|---|
| JP | 2013080537 A | 5/2013 |
| JP | 2014154169 A | 8/2014 |
| JP | 2015079495 A | 4/2015 |

\* cited by examiner

FIG.5

| NAND PAGE ADDRESS | EraseCount | CompressionFlag Cpflag |
|---|---|---|
| PAGE ADDRESS N | | 1 |
| ⋮ | ⋮ | ⋮ |
| PAGE ADDRESS M | | 0 |

FIG.6A

Pattern U1

CRu≦50%  | 0 | X |

FIG.6B

Pattern U2

50%＜CRu≦75%  | X | X | 0 | X |

FIG.6C

Pattern U3

75%＜CRu≦80%  | X | X | 0 | X | X |

FIG.7A

Pattern L1

CRI≦50% | X | 1 |

FIG.7B

Pattern L2

50%<CRI≦75% | X | X | X | 1 |

FIG.7C

Pattern L3

75%<CRI≦80% | X | X | X | X | 1 |

FIG.8A

CRu≦50%、CRl≦50%

| Cell NUMBER | 0 | 1 | 2 | 3 | 4 | 5 | 6 | 7 | |
|---|---|---|---|---|---|---|---|---|---|
| Upper Page | 0 | X | 0 | X | 0 | X | 0 | X | ... |
| Lower Page | X | 1 | X | 1 | X | 1 | X | 1 | ... |
| DISTRIBUTION IN MLC | BA | AE | BA | AE | BA | AE | BA | AE | |

FIG.8B

CRu≦50%、50%＜CRl≦75%

| Cell NUMBER | 0 | 1 | 2 | 3 | 4 | 5 | 6 | 7 | |
|---|---|---|---|---|---|---|---|---|---|
| Upper Page | 0 | X | 0 | X | 0 | X | 0 | X | ... |
| Lower Page | X | X | X | 1 | X | X | X | 1 | ... |
| DISTRIBUTION IN MLC | BA | * | BA | AE | BA | * | BA | AE | |

FIG.8C

CRu≦50%、75%＜CRl≦80%

| Cell NUMBER | 0 | 1 | 2 | 3 | 4 | 5 | 6 | 7 | 8 | 9 | 10 | 12 | |
|---|---|---|---|---|---|---|---|---|---|---|---|---|---|
| Upper Page | 0 | X | 0 | X | 0 | X | 0 | X | 0 | X | 0 | X | ... |
| Lower Page | X | X | X | X | 1 | X | X | X | X | 1 | X | X | ... |
| DISTRIBUTION IN MLC | BA | * | BA | * | A | * | BA | * | BA | AE | BA | * | |

FIG.9A

50% < CRu ≦ 75%、CRl ≦ 50%

| Cell NUMBER | 0 | 1 | 2 | 3 | 4 | 5 | 6 | 7 | |
|---|---|---|---|---|---|---|---|---|---|
| Upper Page | X | X | 0 | X | X | X | 0 | X | ... |
| Lower Page | X | 1 | X | 1 | X | 1 | X | 1 | ... |
| DISTRIBUTION IN MLC | * | A E | B A | A E | * | A E | B A | A E | |

FIG.9B

50% < CRu ≦ 75%、50% < CRl ≦ 75%

| Cell NUMBER | 0 | 1 | 2 | 3 | 4 | 5 | 6 | 7 | |
|---|---|---|---|---|---|---|---|---|---|
| Upper Page | X | X | 0 | X | X | X | 0 | X | ... |
| Lower Page | X | X | X | 1 | X | X | X | 1 | ... |
| DISTRIBUTION IN MLC | * | * | B A | A E | * | * | B A | A E | |

FIG.9C

50% < CRu ≦ 75%, 75% < CRl ≦ 80%

| Cell NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Upper Page | x | x | 0 | x | x | x | 0 | x | x | x | 0 | x | x | x | 0 | x | x | x | 0 | x | x | x | 0 | x |
| Lower Page | x | x | x | x | 1 | x | x | x | x | 1 | x | x | x | x | 1 | x | x | x | x | 1 | x | x | x | x |
| DISTRIBUTION IN MLC | * | * | B A | * | A E | * | B A | * | * | A E | B A | * | * | * | A | * | * | * | B A | A E | * | * | B A | * |

FIG.14A

50% < CRu ≦ 75%、CRl ≦ 50%

Pattern A1

| Cell NUMBER | 0 | 1 | 2 | 3 | 4 | 5 | 6 | 7 | |
|---|---|---|---|---|---|---|---|---|---|
| Upper Page | 0 | X | X | X | 0 | X | X | X | ... |
| Lower Page | X | 1 | 1 | X | X | 1 | 1 | X | ... |
| DISTRIBUTION IN MLC | BA | AE | AE | * | BA | AE | AE | * | |

FIG.14B

50% < CRU ≦ 75%、50% < CRl ≦ 75%

Pattern A2

| Cell NUMBER | 0 | 1 | 2 | 3 | 4 | 5 | 6 | 7 | 8 | 9 | 10 | 11 | |
|---|---|---|---|---|---|---|---|---|---|---|---|---|---|
| Upper Page | X | 0 | X | X | X | 0 | X | X | 0 | X | X | | ... |
| Lower Page | X | X | X | 1 | 1 | X | X | X | X | X | 1 | | ... |
| DISTRIBUTION IN MLC | * | BA | * | AE | AE | * | BA | * | * | BA | * | AE | |

FIG.14C

50% < CRu ≤ 75%, 75% < CRl ≤ 80%

Pattern A3

| Cell NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| Upper Page | 0 | x | x | 0 | x | x | x | x | x | 0 | x | x | x | x | 0 | x | x | 0 | x | x | 0 | x |
| Lower Page | x | x | x | x | x | x | 1 | 1 | x | x | 1 | 1 | 1 | x | x | x | x | x | x | x | x | x |
| DISTRIBUTION IN MLC | B A | * * | * * | B A | * A | * * | A E | A E | * A | B A | A E | A E | A E | * A | B A | * A | * A | B A | * A | * * | B A | * * |

MEMORY CONTROLLER, METHOD OF CONTROLLING NONVOLATILE MEMORY AND MEMORY SYSTEM

CROSS-REFERENCE TO RELATED APPLICATIONS

This application is based upon and claims the benefit of priority from U.S. Provisional Application No. 62/305,485, filed on Mar. 8, 2016; the entire contents of which are incorporated herein by reference.

FIELD

Embodiments described herein relate generally to a memory controller controlling a nonvolatile memory, a method of controlling a nonvolatile memory, and a memory system.

BACKGROUND

In flash memories, there is a possibility that a threshold voltage of a cell is changed due to capacitive coupling between adjacent cells, and gargled data is generated.

BRIEF DESCRIPTION OF THE DRAWINGS

FIG. 5 is a diagram that illustrates an example of a management table storing meta data;

FIG. 6A is a diagram that illustrates an example of a padding pattern for an upper page at the time of $CRu \leq 50\%$, FIG. 6B is a diagram that illustrates an example of a padding pattern for an upper page at the time of $50\% < CRu \leq 75\%$, and FIG. 6C is a diagram that illustrates an example of a padding pattern for an upper page at the time of $75\% < CRu \leq 80\%$;

FIG. 7A is a diagram that illustrates an example of a padding pattern for a lower page at the time of $CR1 \leq 50\%$, FIG. 7B is a diagram that illustrates an example of a padding pattern for a lower page at the time of $50\% < CR1 \leq 75\%$, and FIG. 7C is a diagram that illustrates an example of a padding pattern for a lower page at the time of $75\% < CR1\ 80\%$;

FIG. 8A is a diagram that illustrates an example of data of an upper page and data of a lower page after a padding process at the time of $CRu \leq 50\%$ and $CR1 \leq 50\%$, FIG. 8B is a diagram that illustrates an example of data of an upper page and data of a lower page after a padding process at the time of $CRu \leq 50\%$ and $50\% < CR1 \leq 75\%$, and FIG. 8C is a diagram that illustrates an example of data of an upper page and data of a lower page after a padding process at the time of $CRu \leq 50\%$ and $75\% < CR1 \leq 80\%$;

FIG. 9A is a diagram that illustrates an example of data of an upper page and data of a lower page after a padding process at the time of $50\% < CRu \leq 75\%$ and $CR1\ 50\%$, FIG. 9B is a diagram that illustrates an example of data of an upper page and data of a lower page after a padding process at the time of $50\% < CRu \leq 75\%$ and $50\% < CR1\ 75\%$, and FIG. 9C is a diagram that illustrates an example of data of an upper page and data of a lower page after a padding process at the time of $50\% < CRu \leq 75\%$ and $75\% < CR1 \leq 80\%$;

FIG. 14A is a diagram that illustrates an example of data of an upper page and data of a lower page after a padding process at the time of $50\% < CRu \leq 75\%$ and $CR1 \leq 50\%$, FIG. 14B is a diagram that illustrates an example of data of an upper page and data of a lower page after a padding process at the time of $50\% < CRu \leq 75\%$ and $50\% < CR1 \leq 75\%$, and FIG. 14C is a diagram that illustrates an example of data of an upper page and data of a lower page after a padding process at the time of $50\% < CRu \leq 75\%$ and $75\% < CR1 \leq 80\%$;

DETAILED DESCRIPTION

In general, according to one embodiment, a memory controller controls a nonvolatile memory. The nonvolatile memory has a plurality of physical sectors. A physical sector includes a plurality of cells. A cell is capable of storing data of m bits using threshold voltage distributions of the m-th power of two. The physical sector stores data of m pages. Here, m is a natural number of two or more. The memory controller includes a compression unit, a padding processing unit, and an output unit. The compression unit generates first compressed data and second compressed data by compressing first data and second data. The padding processing unit pads first padding data for the first compressed data in accordance with a first padding pattern and pads second padding data for the second compressed data in accordance with a second padding pattern. The first padding pattern is determined based on at least a compression rate of the first data. The second padding pattern is determined based on at least a compression rate of the second data. The output unit writes the padding-processed first compressed data into a first page of the nonvolatile memory and writes the padding-processed second compressed data into a second page of the nonvolatile memory. The first page and the second page are pages different from each other.

Exemplary embodiments of a memory controller, a method of controlling a nonvolatile memory, and a memory system will be described below in detail with reference to the accompanying drawings. The present invention is not limited to the following embodiments.

First Embodiment

Figure 1:
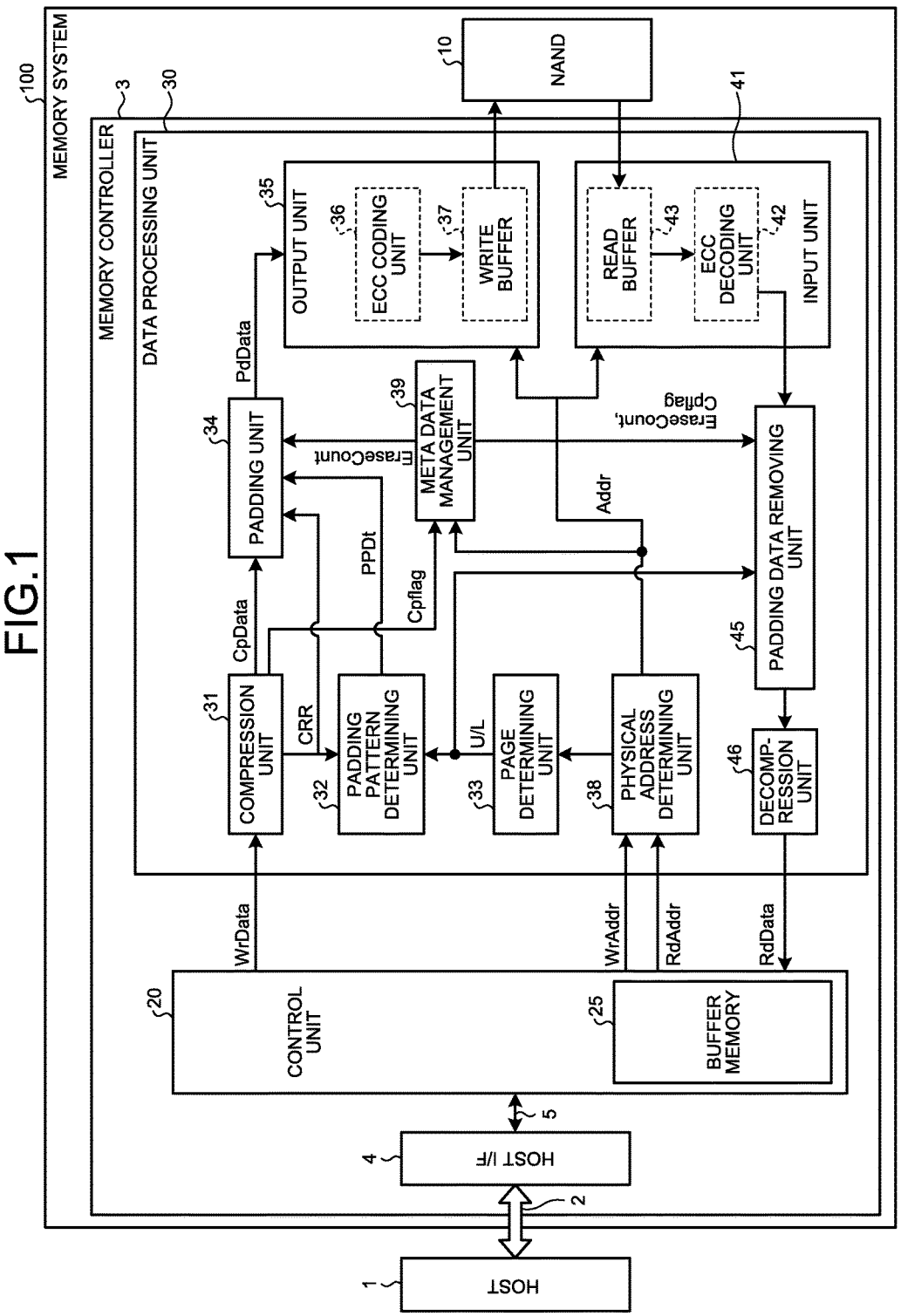
FIG. 1 is a functional block diagram that illustrates an example of the internal configuration of a memory system according to a first embodiment.

FIG. 1 is a block diagram that illustrates an example of the configuration of a memory system 100 according to a first embodiment. The memory system 100 is connected to a host apparatus (hereinafter, abbreviated as a host) 1 through a communication line 2 and functions as an external storage device of the host 1. The host 1, for example, may be an information processing apparatus such as a personal computer, a mobile phone, or an imaging apparatus and may be a mobile terminal such as a tablet computer or a smartphone.

The memory system 100 includes: a NAND flash memory (hereinafter, abbreviated as a NAND) 10 as a nonvolatile memory and a memory controller 3. The nonvolatile memory is not limited to the NAND flash memory but may be a flash memory having a three-dimensional structure, a resistance random access memory (ReRAM), a ferroelectric random access memory (FeRAM), or the like.

The NAND 10 includes one or more memory chips each including a memory cell array. The memory cell array includes a plurality of cells arranged in a matrix pattern. The memory cell array includes a plurality of blocks that are units for data erasing. Each block is configured by a plurality of physical sectors MS (see FIG. 2). The configuration of the memory cell array is not particularly limited, but the memory cell array may be a memory cell array having a two-dimensional structure, a memory cell array having a three-dimensional structure, or a memory cell array having any other structure.

Figure 2:
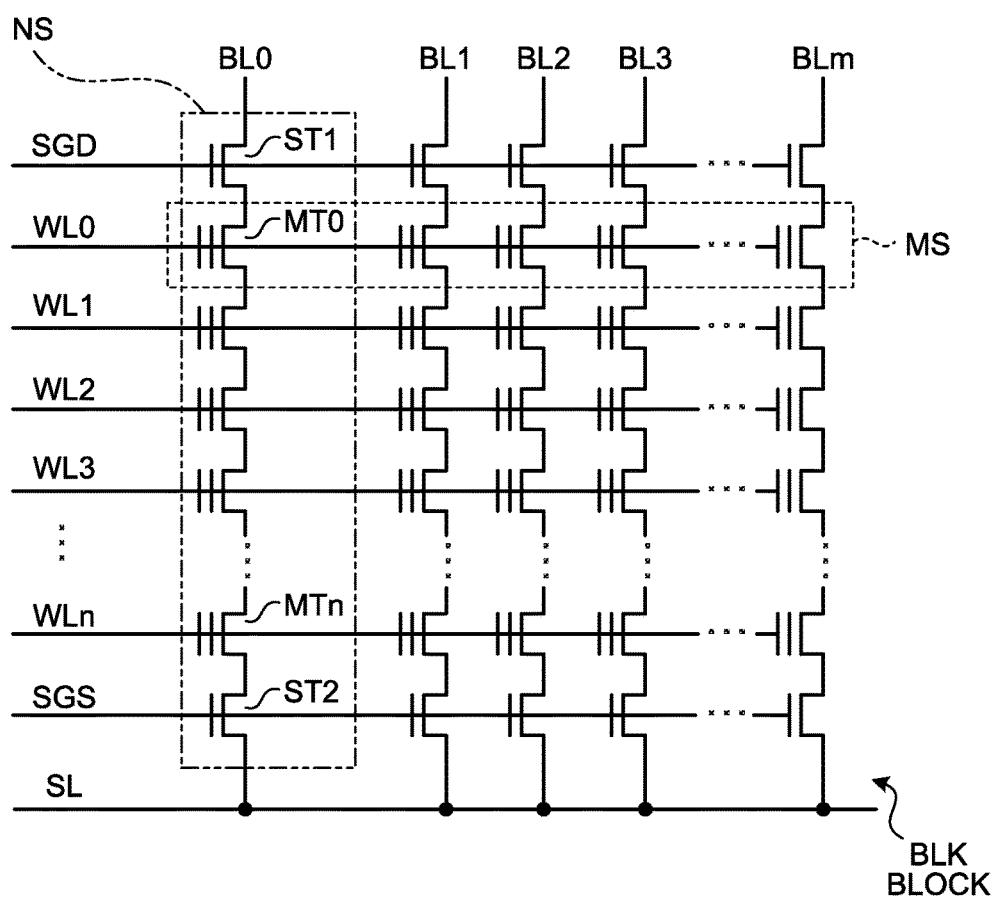
FIG. 2 is a diagram that illustrates an example of the circuit configuration of a memory cell array.

FIG. 2 is a diagram that illustrates an example of the configuration of a block of a memory cell array having a two-dimensional structure. FIG. 2 illustrates one block among a plurality of blocks configuring the memory cell array having the two-dimensional structure. Any other block has a configuration similar to that illustrated in FIG. 2. The block BLK of the memory cell array includes (m+1) (here, m is an integer of "0" or more) NAND strings NS. Each NAND string NS includes: (n+1) (here, n is an integer of zero or more) cell transistors MT0 to MTn connected in series to share a diffusion area (a source region or a drain region) between cell transistors MT adjacent to each other; and selection transistors ST1 and ST2 arranged at both ends of the column of the cell transistors MT0 to MTn.

Word lines WL0 to WLn are respectively connected to control gate electrodes of the cell transistors MT0 to MTn. In addition, cell transistors MTi (here, i=0 to n) are connected to be common using the same word line WLi (here, i=0 to n). In other words, the control gate electrodes of the cell transistors MTi disposed in the same row within the block BLK are connected to the same word line WLi.

Each of the cell transistors MT0 to MTn is configured by a field effect transistor having a stacked gate structure formed on a semiconductor substrate. Here, the stacked gate structure includes: a charge storage layer (floating gate electrode) formed on the semiconductor substrate with a gate insulating film being interposed therebetween; and a control gate electrode formed on the charge storage layer with an inter-gate insulating film being interposed therebetween. A threshold voltage of each of the cell transistors MT0 to MTn changes according to the number of electrons storable in the floating gate electrode and thus, can store data according to a difference in the threshold voltage.

Bit lines BL0 to BLm are respectively connected to the drains of (m+1) selection transistors ST1 within one block BLK, and a selection gate line SGD is connected to be common to the gates of the selection transistors. In addition, the source of the selection transistor ST1 is connected to the drain of the cell transistor MT0. Similarly, a source line SL is connected to be common to the sources of the (m+1) selection transistors ST2 within one block BLK, and a selection gate line SGS is connected to be common to the gates of the selection transistors. In addition, the drain of the selection transistor ST2 is connected to the source of the cell transistor MTn.

Each cell is connected not only to the word line but also to the bit line. Each cell can be identified by using an address used for identifying a word line and an address used for identifying a bit line. The data of cells (the cell transistors MT) disposed within the same block BLK is erased altogether. On the other hand, data is written and read in units of physical sectors MS. One physical sector MS includes a plurality of cells connected to one word line.

Each cell can perform multi-value storage. In a case where the cells are operated in a single level cell (SLC) mode, one physical sector MS corresponds to one page. On the other hand, in a case where the cells are operated in a multiple level cell (MLC) mode, one physical sector MS corresponds to two pages. In a case where the cells are operated in a triple level cell (TLC) mode, one physical sector MS corresponds to three pages. In a case where the cells are operated in a quadruple level cell (QLC) mode, one physical sector MS corresponds to four pages.

In a read operation and a program operation, one word line is selected according to the physical address, and one physical sector MS is selected. A translation into a page within this physical sector MS is performed using the physical address.

In the NAND 10, user data transmitted from the host 1, management information used for managing the user data, and the like are stored. The management information includes a logical/physical translation table and the like.

The memory controller 3 includes: a host interface 4; a control unit 20; and a data processing unit 30. The host I/F 4 performs a process according to the specification of an interface with the host 1 and outputs a command, user data (write data), and the like received from the host 1 to an internal bus 5. In addition, the host I/F 4 transmits user data read from the NAND 10, a response from the control unit 20, and the like to the host 1.

The control unit 20 functions as a main control unit of the memory controller 3. The control unit 20 includes a buffer memory 25. The function of the control unit 20 is realized by one or a plurality of CPUs (processors) executing firmware loaded into the buffer memory 25 and a peripheral circuit.

The buffer memory 25 is a semiconductor memory that can be accessed at a speed higher than the speed of the NAND 10. The buffer memory 25, for example, is a volatile memory, and a static random access memory (SRAM) or a dynamic random access memory (DRAM) is used as the buffer memory. The buffer memory 25 includes storage areas as a write data buffer, a read data buffer, and a meta data buffer. Data received from the host 1 is temporarily stored in the write buffer before being written into the NAND 10. Data read from the NAND 10 is temporarily stored in the read data buffer before being transmitted to the host 1. The management information stored in the NAND 10 is loaded into the meta data buffer. The management information loaded into the meta data buffer is backed up in the NAND 10.

The control unit 20 performs a process according to the command received from the host 1. For example, in a case where a write request is received, the control unit 20 temporarily stores write data in the buffer memory 25. The write request includes a write command, a write address WrAddr, and write data WrData. The control unit 20 reads the write data WrData stored in the buffer memory 25 and outputs the read write data WrData to the data processing unit 30. In addition, the control unit 20 outputs a write address WrAddr corresponding to the write data WrData to the data processing unit 30.

On the other hand, in a case where a read request is received, the control unit 20 outputs a read address RdAddr designated by the read request to the data processing unit 30.

The control unit 20 manages user data by using a logical/physical translation table that is one of the management information described above loaded in the buffer memory 25. In the logical/physical translation table, mapping associating a logical address WrAddr that can be designated by the host 1 and a physical address Addr of the NAND 10 with each other is registered. As the logical address, for example, logical block addressing (LBA) is used. The physical address Addr represents a storage position on the NAND 10 in which data is stored.

The control unit 20 performs management of blocks included in the NAND 10 by using a block management table that is one of the management information described above. The block management table, for example, manages the following block management information.

a number of times of erasing (erase count) in units of blocks

Information used for identifying whether a block is an active block or a free block Block address of a bad block In an active block, valid data is recorded. In a free block, valid data is not recorded. The free block can be reused as an erased block after erasing data thereof. The valid data is data associated with a logical address, and invalid data is data with which a logical address is not associated. When data is written into an erased block, the erased block becomes an active block. A bad block is an unusable block that does not normally operate due to various factors.

The data processing unit 30 includes: a compression unit 31; a padding pattern determining unit 32; a page determining unit 33; a padding unit 34; an output unit 35; a physical address determining unit 38; a meta data management unit 39; an input unit 41; a padding data removing unit 45; and a decompression unit 46. The compression unit 31, the padding pattern determining unit 32, the page determining unit 33, the padding unit 34, and the output unit 35 configure a write processing unit that writes data into the NAND 10. The input unit 41, the padding data removing unit 45, and the decompression unit 46 configure a read processing unit that reads data from the NAND 10. The function of each element configuring the data processing unit 30 is realized by a CPU executing firmware and/or hardware.

Figure 3:
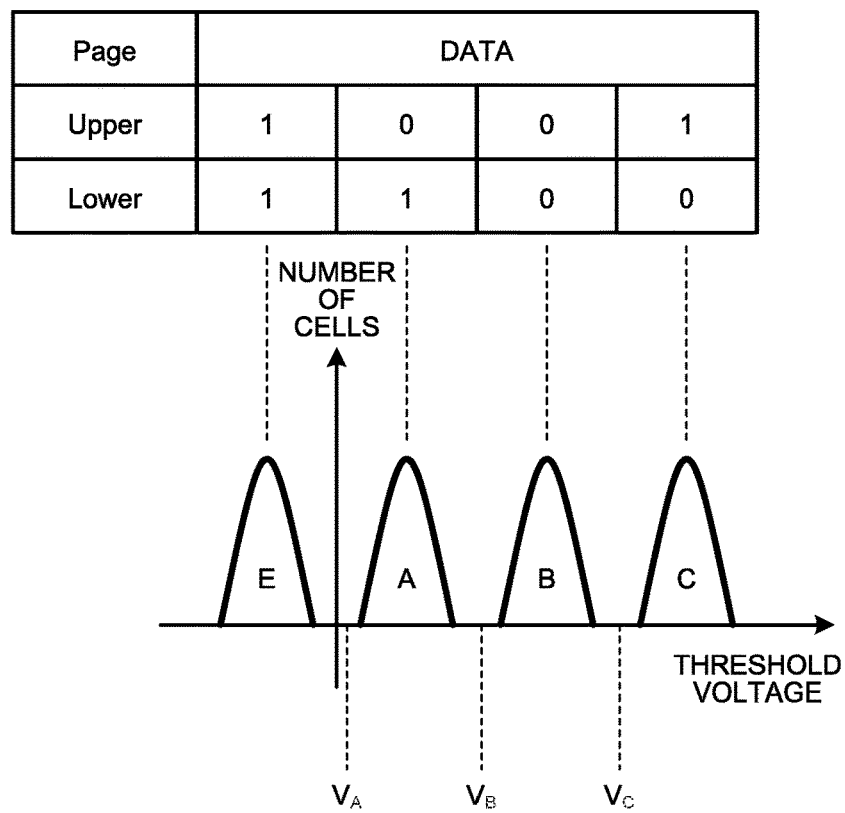
FIG. 3 is a diagram that illustrates an example of a threshold voltage distribution and data coding of a memory cell of 2 bits/cell.

FIG. 3 is a diagram that illustrates an example of threshold voltage distributions and data coding of memory cells of two bits/cell operating in the MLC mode. In a lower diagram illustrated in FIG. 3, the horizontal axis represents the threshold voltage, and the vertical axis represents the number of cells. In the case of memory cells of two bits/cell, four distributions formed by a distribution E, a distribution A, a distribution B, and a distribution C are included. The distribution E has a lowest threshold voltage and corresponds to a threshold voltage distribution of an erased state. The threshold voltage is higher in order of the distributions A, B, and C. Thus, the distribution C has a maximum threshold voltage. Data values of two bits are associated with the threshold voltage distributions E, A, B, and C. Such association is called data coding. The data coding is set in advance. At the time of writing (programming) data, electric charge is injected into cells such that a threshold voltage distribution corresponding to a stored data value is formed in accordance with data coding. One physical sector corresponds to two pages. In this embodiment, these two pages will be referred to as a lower page and an upper page.

In FIG. 3, an upper diagram is a diagram that illustrates an example of data coding. The distribution E corresponds to a data value of "11", the distribution A corresponds to a data value of "01", the distribution B corresponds to a data value of "00", and the distribution C corresponds to a data value of "10". In this embodiment, when data of the upper page is denoted by Du, and data of the lower page is denoted by Dl, the data value of two bits will be denoted as "DuDl". The data coding is not limited to the example illustrated in FIG. 3. A reading voltage VA is set between the distribution E and the distribution A, a reading voltage VB is set between the distribution A and the distribution B, and a reading voltage VC is set between the distribution B and the distribution C. Here, VB is a reading voltage used for determining the data value of the lower page, and VA and VC are reading voltages used for determining the data value of the upper page.

In flash memories, there are cases where an incorrect data value is read in a reading process due to an interference between adjacent cells. More specifically, a threshold voltage of a cell changes according to capacitive coupling between adjacent floating gates (FG). A change $\Delta V$ of the threshold voltage can be represented using the following Equation (1).

$$\Delta V = \text{(Threshold voltage difference between adjacent cells)} \times \text{(capacitance between FGs)}/\text{(All FG capacitance)} \quad (1)$$

The influence is high in a case where threshold voltage levels of adjacent cells are equivalent to maximum-minimum-maximum or minimum-maximum-minimum. In case of two bits/cell, the influence is high in a case where the distributions are equivalent to distribution C-distribution E-distribution C (hereinafter, abbreviated to C-E-C) or distribution E-distribution C-distribution E (hereinafter, abbreviated to E-C-E).

Figure 4:
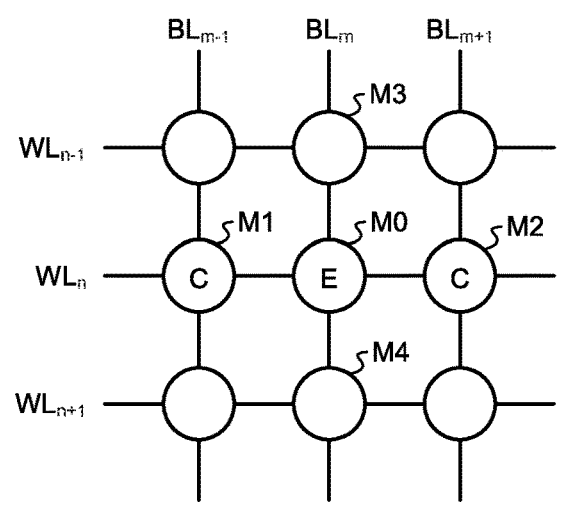
FIG. 4 is a diagram that illustrates an arrangement pattern of a threshold voltage distribution of adjacent cells in which an inter-cell interference phenomenon is degraded.

FIG. 4 illustrates an example of an arrangement pattern of a threshold voltage distribution of adjacent cells in which the inter-cell interference phenomenon is degraded. A cell M0 illustrated in FIG. 4 belongs to a distribution E having a lowest threshold voltage. In addition, cells M1 and M2 adjacent to the cell M0 in the direction of the word line belong to a distribution C having a highest threshold voltage. The cell M0 is influenced by the cells M1 and M2 adjacent in the direction of the word line and cells M3 and M4 adjacent in the direction of the bit line. In this memory system, interferences between cells aligned in the direction of the word line will be considered. Interferences between memory cells aligned in the direction of the bit line can be handled similarly to the interferences between memory cells aligned in the direction of the word line by referring to memory cells on an adjacent word line.

In order to cope with the interference phenomenon, there is a technique called constrained coding for performing coding such that C-E-C and E-C-E do not appear. According to such a technique, a data decompressing process is performed for data combining data of an upper page and data of a lower page. According to such a technique, the amount of data after coding becomes large. In a case where the amount of data after coding becomes large, logical addresses and physical addresses do not have one-to-one correspondence, and an overhead at the time of reading or writing data increases.

Thus, in the first embodiment, page data to be written is compressed in units of pages, and a padding pattern is determined according to the compression rate of the page data. For example, in the case of the MLC mode, a padding pattern for the lower page is determined according to the compression rate of the lower page data, and a padding pattern for the upper page is determined according to the compression rate of the upper page data. The padding pattern defines padding data ("0" or "1") and a data position at which the padding data is padded. The padding pattern described above is determined such that the probability of the occurrence of C-E-C or E-C-E is lowered. For the compressed page data, padding data according to the determined padding pattern is added to defined data positions in a distributed manner. Then, the page data to which the padding data is added is written into the NAND 10. The data length after the padding process is the same as the data length before the compression process.

The elements of the data processing unit 30 illustrated in FIG. 1 will be described. The physical address determining unit 38 translates the write address WrAddr into the physical address Addr by using the logical/physical translation table and outputs the physical address Addr to the page determining unit 33, the meta data management unit 39, and the output unit 35. In addition, the physical address determining unit 38 translates the read address RdAddr into the physical address Addr by using the logical/physical translation table and outputs the physical address Addr to the page determining unit 33, the meta data management unit 39, and the input unit 41. The function performed by the physical address determining unit 38 may be configured to be performed by the control unit 20.

The page determining unit 33 determines a page, which is a write target page, among N pages included in one physical sector MS. In the case of the MLC mode in which one physical sector MS is associated with two pages, the page determining unit 33 determines whether the write target page is an upper page or a lower page. The page determining unit 33 notifies a result of the determination to the padding pattern determining unit 32. Similarly, the page determining unit 33 determines whether a read target page is an upper page or a lower page and notifies a result of the determination to the padding data removing unit 45.

The compression unit 31 performs lossless compression of write data WrData input from the control unit 20 and decreases the number of bits of the write data WrData. A technique used for the compression is arbitrary, and a technique enabling lossless compression is used. When the compression corresponding to one page of the write data WrData ends, the compression unit 31 calculates a compression rate CR. The compression rate CR, for example, is represented as a percentage of a data length after the compression with respect to a data length of the original write data WrData, which is input, corresponding to one page. The compression unit 31 outputs compressed data CpData to which dummy data D is added in accordance with the calculated compression rate CR to the padding unit 34.

When the compression rate CR is 50%, 75%, or 80%, the compression unit 31 outputs the compressed write data WrData as it is to the padding unit 34 as compressed write data CpData without adding dummy data D thereto. When the compression rate CR is less than 50%, the compression unit 31 adds dummy data D to the end of the compressed write data WrData until the compression rate CR becomes 50% and sets resultant data as compressed data CpData. When the compression rate CR is higher than 50% and lower than 75%, the compression unit 31 adds dummy data D to the end of the compressed write data WrData until the compression rate CR becomes 75% and sets resultant data as compressed data CpData. When the compression rate CR is higher than 75% and lower than 80%, the compression unit 31 adds dummy data D to the end of the compressed write data WrData until the compression rate CR becomes 80% and sets resultant data as compressed data CpData. In addition, when the compression with a compression rate CR of a certain ratio or less (in this embodiment, 80% or less) cannot be performed, the compression unit 31 sets the original write data WrData before compression as compressed data CpData. When the compressed data CpData is output, the compression unit 31 outputs a compression flag Cpflag representing whether data after compression or data before compression is output to the meta data management unit 39. For example, when Cpflag=1, it represents that compression is performed. On the other hand, when Cpflag=0, it represents that no compression is performed. In addition, the compression unit 31 notifies a compression rate range signal CRR representing a range (CR≤50%, 50%<CR 75%, 75%<CR≤80%, or 80%<CR) to which the compression rate CR belongs to the padding pattern determining unit 32 and the padding unit 34.

The meta data management unit 39 stores and manages management information (meta data) of each page. FIG. 5 is a diagram that illustrates an example of a meta data table managed by the meta data management unit 39. In this meta data table, for each page address of the NAND 10, an erase count and the compression flag Cpflag are managed. In place of the erase count, the number of times of programming for each page may be managed. Since an erasing process is performed in units of blocks, the erase count may be managed in units of blocks. It is determined whether data written into each page of the NAND 10 is compressed or not based on the compression flag Cpflag. The function performed by the meta data management unit 39 may be performed by the control unit 20.

The padding pattern determining unit 32 notifies padding pattern information PPDt representing the content of the determined padding pattern to the padding unit 34 based on a page determination result notified from the page determining unit 33 and the compression rate range signal CRR. More specifically, the padding pattern determining unit 32 notifies padding pattern information PPDt representing the content of a padding pattern selected from among a plurality of padding patterns based on the page determination result and the compression rate range signal CRR. The padding pattern defines an occurrence period of a padding pattern, an insertion position of padding data for the compressed data CpData, and whether the padding data is "0" or "1".

FIGS. 6A to 6C illustrate examples of padding patterns used for the upper page. FIG. 6A illustrates Pattern U1 at the time of a compression rate CRu of 50% or less (hereinafter, represented as Condition 1), FIG. 6B illustrates Pattern U2 at the time of a compression rate CRu of more than 50% and 75% or less (hereinafter, represented as Condition 2), and FIG. 6C illustrates Pattern U3 at the time of a compression rate CRu of more than 75% and 80% or less (hereinafter, represented as Condition 3). In the cases of FIGS. 6A to 6C, one square corresponds to data of one bit to be stored in one cell. "0" represents padding data "0" added to the compressed data CpData. "X" represents that padding data is not present. At a bit position corresponding to a square including "X", the compressed data CpData output from the compression unit 31 is inserted. Hereinafter, one bit of the compressed data CpData output from the compression unit 31 will be described as "X". X includes data acquired by compressing the write data WrData or dummy data D.

Pattern U1 (FIG. 6A) has a period of two bits and padding data "0" and compressed data "X" are alternately repeated. In Pattern U2 (FIG. 6B), compressed data "X" is selected as data of 1st, 2nd, and 4th bits, padding data "0" is selected as data of a 3rd bit, and a period of such four bits is repeated. In Pattern U3 (FIG. 6C), compressed data "X" is selected as data of 1st, 2nd, 4th, and 5th bits, padding data "0" is selected as data of a 3rd bit, and a period of such five bits is repeated. In a case where the page determination result is the upper page, the padding pattern determining unit 32 selects one from among Patterns U1 to U3 illustrated in FIGS. 6A to 6C based on the compression rate range signal CRR and notifies the padding pattern information PPDt of the selected padding pattern. The padding pattern information PPDt, for example, includes information representing an occurrence period of the pattern, a padding data insertion position, and padding data of "0" or "1" to be inserted.

FIGS. 7A to 7C illustrate examples of padding patterns used for the lower page. FIG. 7A illustrates Pattern L1 used when the compression rate CR1 is equal to or lower than 50% (hereinafter, represented as Condition 4), FIG. 7B illustrates Pattern L2 used when the compression rate CR1 is higher than 50% and equal to or lower than 75% (hereinafter, represented as Condition 5), and FIG. 7C illustrates Pattern L3 used when the compression rate CR1 is higher than 75% and equal to or lower than 80% (hereinafter, represented as Condition 6). "1" represents padding data "1" added to the compression data CpData.

Pattern L1 (FIG. 7A) has a period of two bits, and compressed data "X" and padding data "1" are alternately repeated therein. In Pattern L2 (FIG. 7B), compressed data "X" is selected as data of 1st, 2nd, and 3rd bits, padding data "1" is selected as data of a 4th bit, and a period of such four bits is repeated. In Pattern L3 (FIG. 7C), compressed data "X" is selected as data of 1st, 2nd, 3rd, and 4th bits, padding data "1" is selected as data of a 5th bit, and a period of such five bits is repeated. In a case where the page determination result is the lower page, the padding pattern determining unit 32 selects one from among Patterns L1 to L3 illustrated in FIG. 7 based on the compression rate range signal CRR and notifies the padding pattern information PPDt of the selected padding pattern.

In the description presented above, while the compression rate is divided into four ranges, the number of divisions of the compression rate and a percent value determining the division ranges are arbitrary.

The padding unit 34 performs a padding process of adding padding data to compressed data CpData based on the compression rate range signal CRR, the padding pattern information PPDt, and the erase count. In addition, when input of uncompressed data CpData is detected based on the compression rate range signal CRR, the padding unit 34 outputs the input data as it is to the output unit 35 as output data PdData without performing the padding process. When the padding process is performed, the padding unit 34 adds padding pattern identification information (hereinafter, abbreviated to a PPID) used for identifying a used padding pattern to page data for which the padding process is performed. Then, the padding unit 34 outputs output data PdData to which the PPID is added to the output unit 35. The length of the output data PdData is the same as the length of the write data WrData corresponding to one page input to the compression unit 31.

FIGS. 8A to 8C and FIGS. 9A to 9C illustrate data of an upper page and a lower page output from the padding unit 34 and a threshold voltage distribution of an MLC corresponding to such data. FIGS. 8A to 8C illustrate cases where the upper page is compressed using Condition 1, and the lower page is compressed using one of Conditions 4 to 6. FIG. 8A illustrates a case where the lower page is compressed using Condition 4. FIG. 8B illustrates a case where the lower page is compressed using Condition 5. FIG. 8C illustrates a case where the lower page is compressed using Condition 6. In addition, a distribution * represents an uncertain state in which the distribution has not been determined as one of four distributions E and A to C. In FIGS. 8A to 8C, the horizontal axis corresponds to a cell number. In the case illustrated in FIGS. 8A to 8C, "0" corresponds to padding data "0" for the upper page, "1" corresponds to padding data "1" for the lower page, and "X" corresponds to compressed data CpData of one bit.

In the case illustrated in FIGS. 8A to 8C, since the upper page is compressed to be 50% or less, Pattern U1 (FIG. 6A) is selected as the padding pattern of the upper page. Accordingly, the padding unit 34 outputs upper page data in which padding data "0" is arranged in the (0+2i)-th cell, and compressed data X is sequentially arranged in the (1+2i)-th cell. Here, i is a natural number of zero or more. In addition, in a case where a lower page is compressed using Condition 4, Pattern L1 (FIG. 7A) is selected. As illustrated in FIG. 8A, the padding unit 34 outputs lower page data in which padding data "1" is arranged in the (1+2i)-th cell, and compressed data X is sequentially arranged in the (0+2i)-th cell. In a case where a lower page is compressed using Condition 5, Pattern L2 (FIG. 7B) is selected. As illustrated in FIG. 8B, the padding unit 34 outputs lower page data in which compressed data X is arranged in the (0+4i)-th, (1+4i)-th, and (2+4i)-th cells, and padding data "1" is arranged in the (3+4i)-th cell. In a case where a lower page is compressed using Condition 6, Pattern L3 (FIG. 7C) is selected. As illustrated in FIG. 8C, the padding unit 34 outputs lower page data in which compressed data X is arranged in the (0+5i)-th, (1+5i)-th, (2+5i)-th, and (3+5i)-th cells, and padding data "1" is arranged in the (4+5i)-th cell.

The data illustrated in FIG. 8A does not include the distribution C. The data illustrated in FIG. 8B includes the distribution * of the uncertain state, and the distribution E or the distribution C does not appear before or after the distribution *. The data illustrated in FIG. 8C includes the distribution * of the uncertain state, and the distribution E or the distribution C does not appear before or after the distribution *. In other words, the arrangement of C-E-C or E-C-E does not appear in any of the data illustrated in FIGS. 8A to 8C.

FIGS. 9A to 9C illustrate cases where the upper page is compressed using Condition 2, and the lower page is compressed using one of Conditions 4 to 6. FIG. 9A illustrates a case where the lower page is compressed using Condition 4. FIG. 9B illustrates a case where the lower page is compressed using Condition 5. FIG. 9C illustrates a case where the lower page is compressed using Condition 6.

In the case illustrated in FIGS. 9A to 9C, since the upper page is compressed to be more than 50% and 75% or less, Pattern U2 (FIG. 6B) is selected as the padding pattern of the upper page. Accordingly, the padding unit 34 outputs upper page data in which compressed data X is arranged in the (0+4i)-th, (1+4i)-th, (3+4i)-th cells, and padding data "0" is arranged in the (2+4i)-th cell. In addition, in a case where a lower page is compressed using Condition 4, Pattern L1 (FIG. 7A) is selected. As illustrated in FIG. 9A, the padding unit 34 outputs lower page data in which compressed data X is arranged in the (0+2i)-th cell, and padding data "1" is arranged in the (1+2i)-th cell. In a case where a lower page is compressed using Condition 5, Pattern L2 (FIG. 7B) is selected. As illustrated in FIG. 9B, the padding unit 34 outputs lower page data in which compressed data X is arranged in the (0+4i)-th, (1+4i)-th, and (2+4i)-th cells, and padding data "1" is arranged in the (3+4i)-th cell. In a case where a lower page is compressed using Condition 6, Pattern L3 (FIG. 7C) is selected. As illustrated in FIG. 9C, the padding unit 34 outputs lower page data in which compressed data X is arranged in the (0+5i)-th, (1+5i)-th, (2+5i)-th, and (3+5i)-th cells, and padding data "1" is arranged in the (4+5i)-th cell.

In the data illustrated in FIG. 9A, only in the (4+8i)-th cell, there is a possibility of the appearance of E-C-E. In the data illustrated in FIG. 9B, only in the (4+8i)-th cell, there is a possibility of the appearance of E-C-E. In the data illustrated in FIG. 9C, only in the (4+20i)-th, (8+20i)-th, (12+20i)-th, (16+20i)-th, or (20+20i)-th cell, there is a possibility of the appearance of E-C-E or C-E-C.

Here, as the dummy data D added to the upper page data by the compression unit 31, "0" is preferable for which there is no possibility of an occurrence of the distribution C having the highest threshold voltage, and, as the dummy data D added to the lower page data described above, "1" is preferable for the same reason. However, the dummy data D is not limited to such data, but any other arbitrary data may be used.

In addition, in a case where the compression rate CRu of the upper page is Condition 3, a padding pattern other than Pattern U3 illustrated in FIG. 6C may be employed. This padding pattern has a period of 10 bits, and, in the padding pattern, padding data "1" is padded into the (2+10i)-th and (6+10i)-th memory cells, and compressed data X is assigned to the other memory cells. In a case where this padding pattern is employed, the rate of the appearance of the distribution C is lower than that of Pattern U3, and the appearance rate of E-C-E or C-E-C decreases in accordance therewith.

Here, when the compression rate range signal CRR representing 80% or less is input from the compression unit 31, the padding unit 34 outputs output data PdData that includes data after the padding process and a PPID. On the other hand, when the compression rate range signal CRR representing more than 80% is input from the compression unit 31, uncompressed write data WrData is output from the compression unit 31 to the padding unit 34. For this reason, within the uncompressed write data WrData corresponding to one page, a bit space in which the PPID is inserted is not present. For this reason, in this case, the output data PdData does not include the PPID.

The PPID included in the upper page data represents one of Patterns U1 to U3 used for the padding and, for example, is information of two bits. The PPID included in the lower page data represents one of Patterns L1 to L3 used for the padding and, for example, is information of two bits. While the PPID may be arranged at an arbitrary position of the output data PdData, in this embodiment, the PPID is assigned to first two bits of the output data PdData. Accordingly, "the case where the compression rate is 50% or less, the case where the compression rate is 50% to 75%, and the case where the compression rate is 75% to 80%" are more accurately "a case where a data length of the compressed data CpData+PPID is 50% of the original data WrData or less, a case where the data length is 50% to 75% of the original data, and a case where the data length is 75% to 80% of the original data".

Here, the padding unit 34 performs control for shifting the padding pattern based on an erase count of a write target page. The erase count is acquired from the meta data management unit 39. For example, in the case illustrated in FIG. 8B, while the period of a padding pattern including the upper page and the lower page is four (bits), the padding unit 34 changes a first cell number based on a remainder acquired by dividing the erase count by four that is the period. For example, in a case where the low-order two bits of the erase count represents "1", the first cell number is set to "1", and the sequence is 1=>2=>3=>0. In such a case, the padding pattern of the upper page is "X0X0", and the padding pattern of the lower page is "XX1X". Similarly, when the low-order two bits of the erase count represents "3", the first cell number is set to "3", and the sequence is 3=>0=>1=>2. In such a case, the padding pattern of the upper page is "X0X0", and the padding pattern of the lower page is "1XXX". By performing such shift control, the position of a cell having a possibility of the appearance of the distribution C having the highest threshold voltage can be changed. In this way, a cell having a large amount of charge injection and thus having a large damage to the tunnel oxide film is circulated, whereby damages to the cells can be averaged. In addition, it may be configured such that the padding pattern is shifted based on whether the erase count is an odd number or an even number so as to form a correspondence relation between a padding pattern and a cell number. Furthermore, in place of the erase count, the number of times of performing programming each page may be employed.

Figure 10:
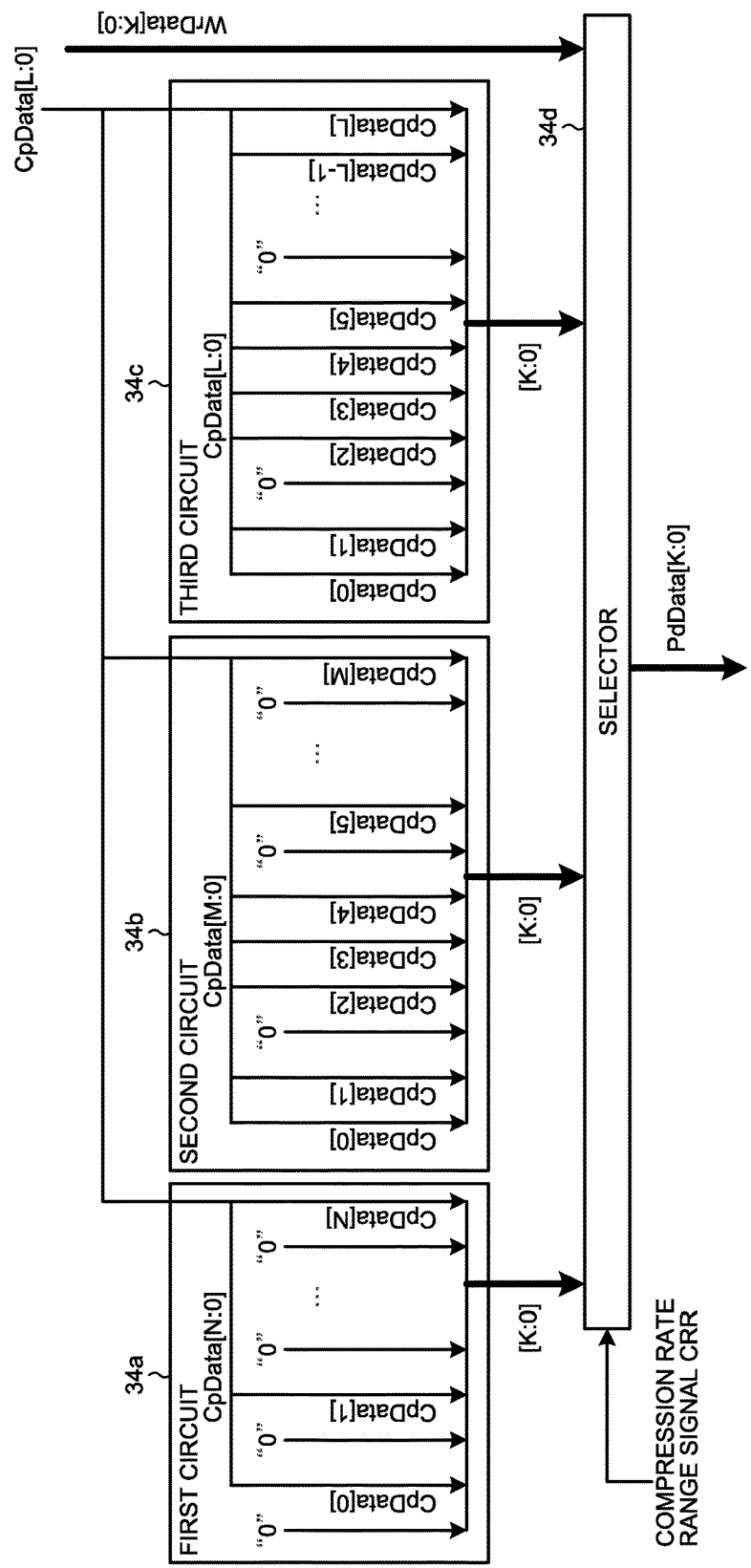
FIG. 10 is a diagram that illustrates an example of the circuit configuration of a padding pattern determining unit and a padding unit.

FIG. 10 is a diagram that illustrates an example of the hardware circuit configuration for realizing the functions of the padding pattern determining unit 32 and the padding unit 34. FIG. 10 illustrates an example of the circuit configuration for performing a padding process of an upper page. The circuit configuration for performing the padding process of a lower page is equal to that illustrated in FIG. 10 and thus, is not illustrated. This hardware circuit includes: a first circuit 34a; a second circuit 34b; a third circuit 34c; and a selector 34d. The write data WrData output from the control unit 20 and the compressed data CpData are input to this hardware circuit. The first circuit 34a performs a padding process based on Pattern U1 illustrated in FIG. 6A for input data of (N+1) bits and outputs output data PdData of (K+1) bits. The second circuit 34b performs a padding process based on Pattern U2 illustrated in FIG. 6B for input data of (M+1) bits and outputs output data PdData of (K+1) bits. The third circuit 34c performs a padding process based on Pattern U3 illustrated in FIG. 6C for input data of (L+1) bits and outputs output data PdData of (K+1) bits. Here, L>M>N. (N+1)×2=(M+1)×4/3=(L+1)×5/4=K+1.

The selector 34d selects one of outputs of the first to third circuits 34a, 34b, and 34c and the write data WrData based on the compression rate range signal CRR of two bits and outputs selected data to the output unit 35 as output data PdData. In a case where the compression rate range signal CRR represents a compression rate of 50% or less, the selector 34d selects the output of the first circuit 34a. In a case where the compression rate range signal CRR represents a compression rate of 50% to 75% or less, the selector 34d selects the output of the second circuit 34b. In a case where the compression rate range signal CRR represents a compression rate of 75% to 80% or less, the selector 34d selects the output of the third circuit 34c. In a case where the compression rate range signal CRR represents a compression rate of more than 80%, the selector 34d selects the write data WrData.

Referring back to FIG. 1, the output unit 35 includes an ECC coding unit 36 and a write buffer 37. The ECC coding unit 36 performs an error correction coding process for the data PdData, thereby generating parity. The ECC coding unit 36 stores a code word including data and parity in the write buffer 37. The output unit 35 outputs the code words stored in the write buffer 37 to the NAND 10 together with the physical address Addr.

The input unit 41 includes an ECC decoding unit 42 and a read buffer 43. The input unit 41 reads a code word from a page of the NAND 10 that corresponds to the physical address Addr. The input unit 41 stores the read code word in the read buffer 43. The input unit 41 inputs the code words stored in the read buffer 43 to the ECC decoding unit 42. The ECC decoding unit 42 performs an error correction decoding process by using the input code words and inputs decoded data (read data) to the padding data removing unit 45.

When the read data is input from the input unit 41, the padding data removing unit 45 acquires a compression flag Cpflag and an erase count corresponding to the physical address Addr of the read data from the meta data management unit 39. The padding data removing unit 45 determines whether or not the read data is compressed based on the acquired compression flag Cpflag.

In a case where the read data is compressed, the padding data removing unit 45 determines whether or not the read target page is an upper page or a lower page based on a determination result acquired by the page determining unit 33, reads the PPID from the first two bits of the read data, and determines a used padding pattern from among Patterns U1 to U3 and L1 to L3. In addition, the padding data removing unit 45 determines a first cell number selected in the shift control performed by the padding unit 34 based on the input erase count. The padding data removing unit 45, first, removes the first two bits corresponding to the PPID from the read data. Next, the padding data removing unit 45 determines an arrangement relation between the compressed data CpData and the padding data based on the determination results of the padding pattern and the first cell number and removes padding data from the read data from which the first two bits have been removed based on the determination. The padding data removing unit 45 outputs the read data from which the first two bits and the padding data have been removed to the decompression unit 46.

In a case where it is determined that the read data is not compressed based on the compression flag Cpflag, the padding data removing unit 45 outputs the read data to the decompression unit 46 as it is.

The decompression unit 46 performs decompression by performing a data translation in a direction opposite to that of the compression process performed by the compression unit 31, thereby restoring the data input from the padding data removing unit 45 to the write data WrData. The restored write data WrData is output to the control unit 20 as read data RdData. The decompression unit 46 performs a decompression process of the input data starting from the first bit and ends the decompression process when the data length becomes a length of the write data corresponding to the original one page. By such a decompression process, the dummy data D added in the compression unit 31 is removed. On the other hand, when read data that is not compressed is input, the decompression unit 46 outputs the data to the control unit 20 without performing the decompression process.

Figure 11:
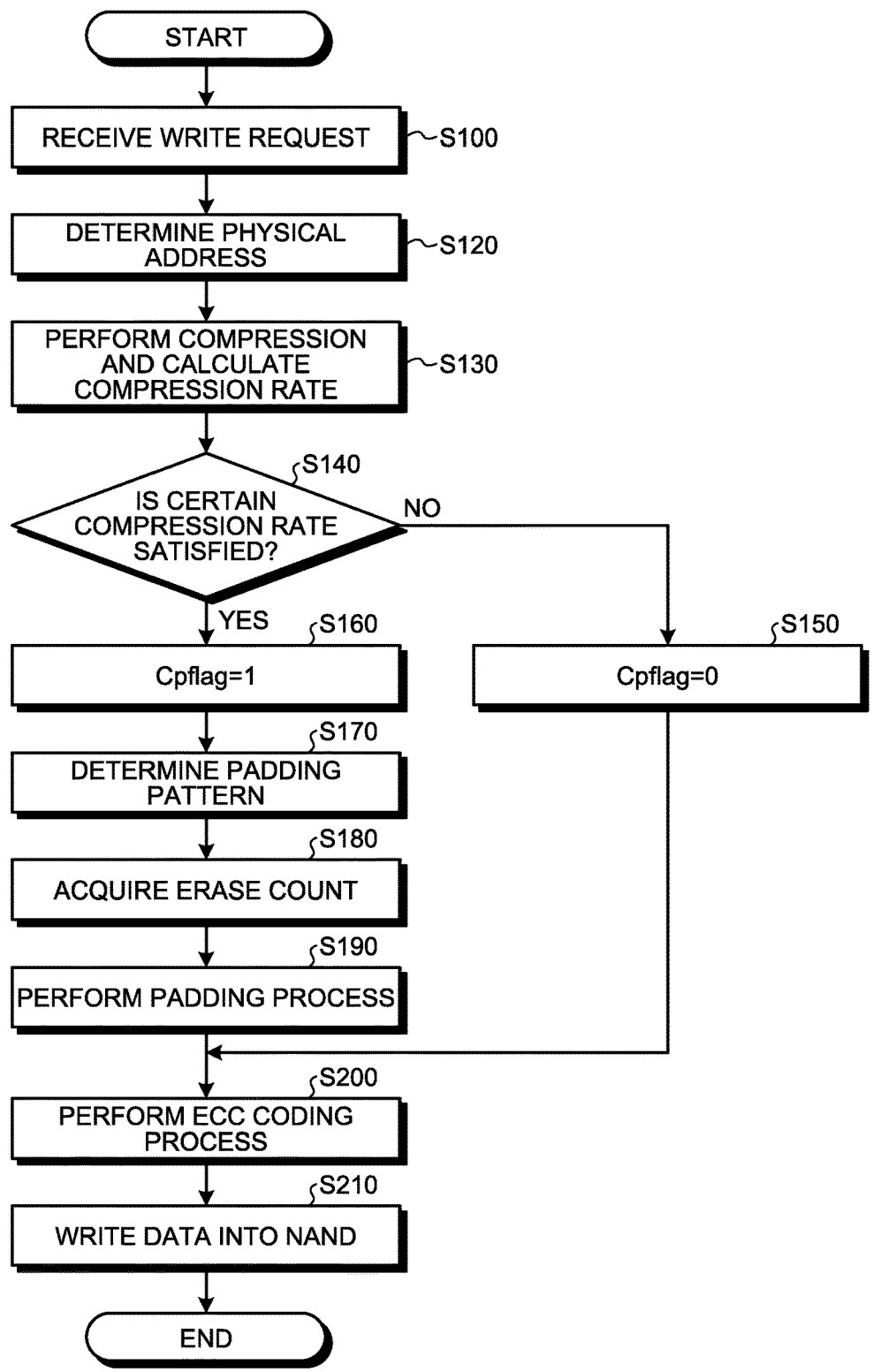
FIG. 11 is a flowchart that illustrates an example of the operation sequence of a memory system according to a first embodiment applied when data is written.

Next, an operation sequence of the memory system 100 that is performed when a write request is received from the host 1 will be described with reference to a flowchart illustrated in FIG. 11. When a write request is received from the host 1 (S100), the control unit 20 temporarily stores write data in the buffer memory 25. The control unit 20 outputs the write data WrData stored in the buffer memory 25 to the data processing unit 30. In addition, the control unit 20 outputs a write address WrAddr designated by the write request to the data processing unit 30. The physical address determining unit 38 outputs a physical address Addr translated from the input write address WrAddr to the page determining unit 33, the meta data management unit 39, and the like (S120).

The page determining unit 33 determines a page among N pages included in one physical sector MS that is the write target page. In the case of the MLC mode, the page determining unit 33 determines whether the write target page is an upper page or a lower page. The page determining unit 33 notifies a result of the determination to the padding pattern determining unit 32.

The compression unit 31 compresses the write data WrData having a size of one page input from the control unit 20. When the compression of the write data WrData having a size of one page ends, the compression unit 31 calculates a compression rate CR (S130). The compression unit 31 notifies a compression rate range signal CRR representing one of the four ranges including CR≤50%, 50%<CR≤75%, 75%<CR≤80%, and 80%<CR to which a calculated compression rate CR belongs to the padding pattern determining unit 32 and the padding unit 34.

The compression unit 31 determines whether or not the compression has been performed up to a certain compression rate or less (in this embodiment, 80% or less) (S140). In a case where the compression cannot be performed such that the compression rate CR is up to a certain compression rate or less (S140: No), the compression unit 31 sets the compression flag Cpflag to "0" and outputs the compression flag to the meta data management unit 39. The meta data management unit 39 updates the compression flag Cpflag included in an entry corresponding to the physical address Addr to "0" (S150). In addition, the compression unit 31 outputs the write data WrData before compression to the padding unit 34 as compressed data CpData. At this time, since the compression rate range signal CRR represents 80%<CR, the padding unit 34 does not perform the padding process but outputs the input compressed data CpData (the write data WrData before compression) to the output unit 35 as it is as output data PdData. The ECC coding unit 36 performs an error correction coding process for the data PdData input from the padding unit 34 (S200) and writes a code word including the data and parity to the NAND 10 through the write buffer 37 (S210).

In a case where the compression can be performed such that the compression rate CR is up to the certain compression rate or less (S140: Yes), the compression unit 31 sets the compression flag Cpflag to "1" and outputs the compression flag to the meta data management unit 39. The meta data management unit 39 updates the compression flag Cpflag included in an entry corresponding to the physical address Addr to "1" (S160). In addition, the compression unit 31 outputs the compressed data CpData to which the dummy data D is added according to the compression rate CR of the compressed data to the padding unit 34.

The padding pattern determining unit 32 notifies the padding pattern information PPDt representing the content of the determined padding pattern to the padding unit 34 based on the page determination result and the compression rate range signal CRR (S170). The padding unit 34 acquires an erase count corresponding to the physical address Addr from the meta data management unit 39. The padding unit 34 performs a padding process of adding padding data to the compressed data CpData based on the compression rate range signal CRR, the padding pattern information PPDt, and the erase count and outputs a result of the padding process to the output unit 35 as output data PdData (S190). In addition, the padding unit 34 adds padding pattern identification information (PPID) of two bits to the start of the output data PdData. The ECC coding unit 36 performs an error correction coding process for the data PdData input from the padding unit 34 (S200) and writes a code words including the data and parity into the NAND 10 through the write buffer 37 (S210).

Figure 12:
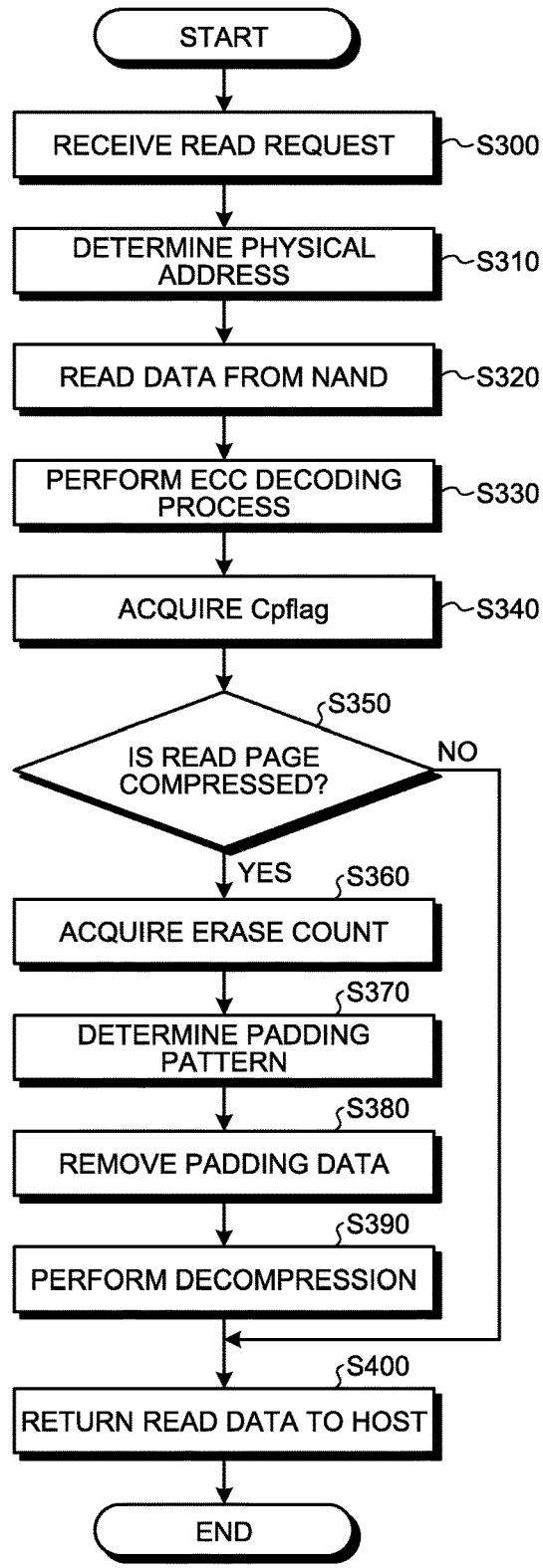
FIG. 12 is a flowchart that illustrates an example of the operation sequence of the memory system according to the first embodiment applied when data is read.

Next, the operation sequence of the memory system 100 performed when a read request is received from the host 1 will be described with reference to a flowchart illustrated in FIG. 12. When a read request is received from the host 1 (S300), the control unit 20 outputs a read address RdAddr designated by the read request to the data processing unit 30. The physical address determining unit 38 outputs a physical address Addr translated from the input read address RdAddr to the padding data removing unit 45 and the input unit 41 (S310).

The input unit 41 reads a code word from a page of the NAND 10 that corresponds to the physical address Addr based on the physical address Addr (S320). The input unit 41 inputs the read code words to the ECC decoding unit 42 through the read buffer 43. The ECC decoding unit 42 performs an error correction decoding process by using the input code word and inputs the decoded data (read data) to the padding data removing unit 45 (S330).

The padding data removing unit 45 acquires a compression flag Cpflag corresponding to the physical address Addr of the read data from the meta data management unit 39 (S340). The padding data removing unit 45 determines the compression flag Cpflag and determines whether or not the read data is compressed (S350). When Cpflag=0, and the read data is not compressed (S350: No), the padding data removing unit 45 outputs the read data to the decompression unit 46 as it is. The decompression unit 46 outputs the data to the control unit 20 as it is without performing the decompression process. The control unit 20 transmits the read data RdData input from the data processing unit 30 to the host 1 through the host I/F 4 (S400).

When Cpflag=1, and the read data is compressed (S350: Yes), the padding data removing unit 45 acquires an erase count corresponding to the physical address Addr of the read data from the meta data management unit 39 (S360). The padding data removing unit 45 determines whether the read target page is an upper page or a lower page based on a result of the determination acquired by the page determining unit 33, reads the PPID from the first two bits of the read data, and determines a used padding pattern (S370). The padding data removing unit 45 determines a correspondence relation between the padding pattern and the cell number based on the erase count. The padding data removing unit 45, first, removes first two bits corresponding to the PPID from the read data input from the input unit 41. Next, the padding data removing unit 45 determines an arrangement relation between the compression data CpData and the padding data based on the determined padding pattern and the determined correspondence relation between the padding pattern and the cell number and, based on the determination, removes padding data from the read data from which the first two bits have been removed (S380). The padding data removing unit 45 outputs the read data from which the first two bits and the padding data have been removed to the decompression unit 46. The decompression unit 46 decompresses data by performing a data translation in a direction opposite to that of the compression process performed by the compression unit 31 for the data input from the padding data removing unit 45, thereby restoring the compressed data to the original write data WrData (S390). The restored write data WrData is output to the control unit 20 as the read data RdData. The control unit 20 transmits the read data RdData input from the data processing unit 30 to the host 1 through the host I/F 4 (S400).

In this way, according to the first embodiment, compression is performed for each page data, and the padding process is performed based on the padding pattern determined according to the compression rate of the compressed page data. For this reason, an increase in the data amount can be prevented while gargled data according to interferences between cells is reduced. In addition, since a one-to-one correspondence between a logical address and a physical address is formed, a low delay time at the time of reading or writing data and a high throughput can be realized.

In the embodiment described above, while the padding pattern identification information PPID is added to the page data stored in the NAND 10, the PPID may be configured to be managed using a meta data table of the meta data management unit 39. In addition, in a case where a redundant area can be secured in the page data, also when uncompressed write data is stored in the NAND 10, the PPID may be added to the write data.

Second Embodiment

According to a second embodiment, the padding pattern of each page is determined according to a set of compression rates of a plurality of pages assigned to a same physical sector. For example, in the case of the MLC mode, while two pages including an upper page and a lower page are assigned to a same physical sector, the padding patterns of the upper page and the lower page are determined based on a set of the compression rate of the upper page data and the compression rate of the lower page data.

Figure 13:
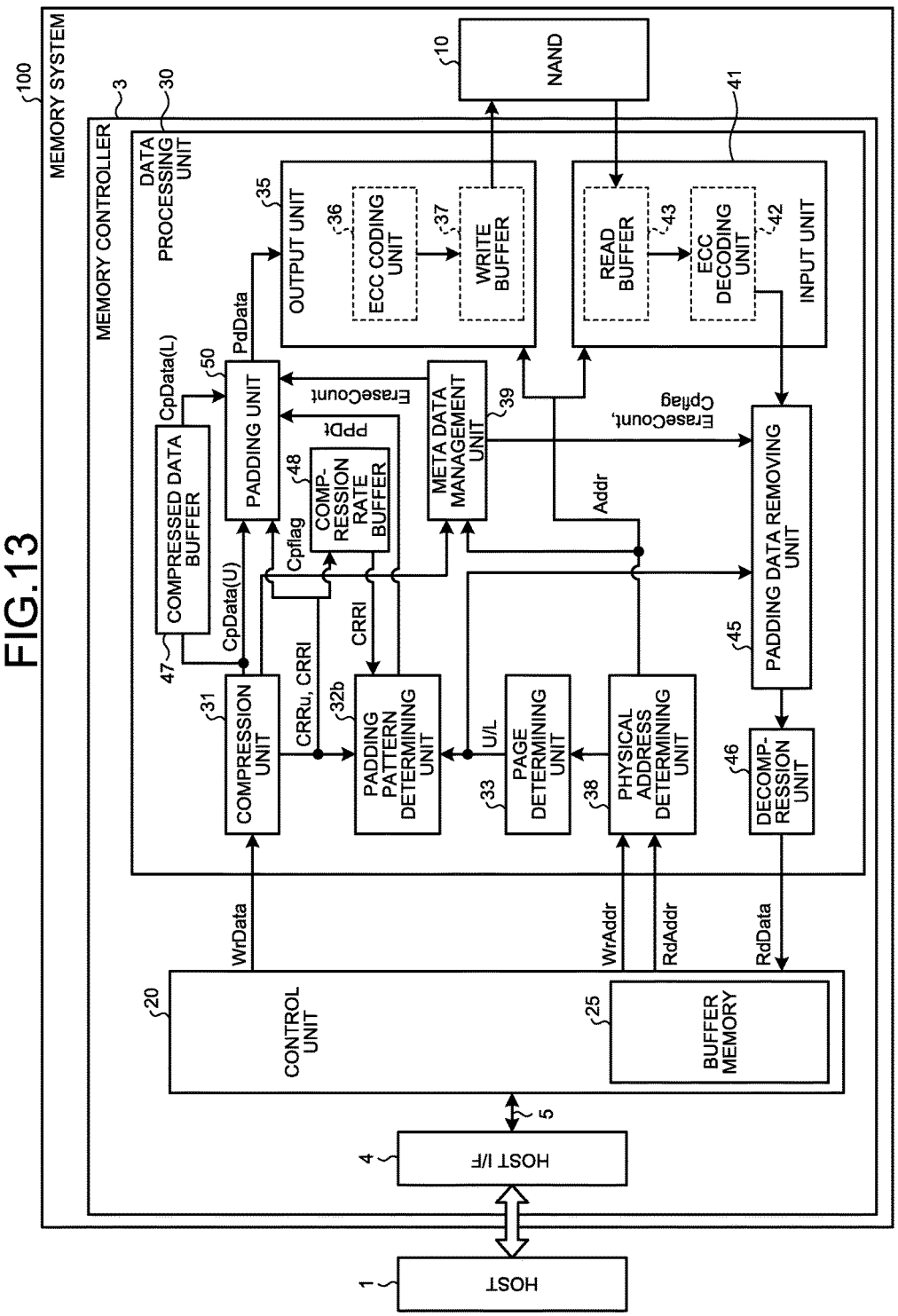
FIG. 13 is a functional block diagram that illustrates an example of the internal configuration of a memory system according to a second embodiment.

FIG. 13 is a block diagram that illustrates an example of the configuration of a memory system 100 according to the second embodiment. In the case illustrated in FIG. 13, a same reference numeral is assigned to a constituent element achieving the same function as that of the memory system 100 illustrated in FIG. 1, and duplicate description will not be presented. In the case illustrated in FIG. 13, a compressed data buffer 47 and a compression rate buffer 48 are added. In addition, in the case illustrated in FIG. 13, in place of the padding pattern determining unit 32 and the padding unit 34, a padding pattern determining unit 32b and a padding unit 50 are included. In description presented below, for the simplification of the description, first, while data of a lower page is written into a NAND 10, and thereafter, data of an upper page is written into the NAND 10, the sequence is not limited thereto. The function of each constituent element configuring a data processing unit 30 is realized by a CPU executing firmware and/or hardware.

A compression unit 31 compresses the data of a lower page and then compresses the data of an upper page. The compressed data buffer 47 buffers the compressed data of the lower page. The compression rate buffer 48 buffers a compression rate range signal CRR1 of the compressed data of the lower page. In other words, the data and the compression rate range signal of the data of a page that has been compressed earlier is buffered.

The compression rate range signal CRR1 of the lower page data is input from the compression rate buffer 48 to the padding pattern determining unit 32b, and a compression rate range signal CRRu of the upper page data is input from the compression unit 31 to the padding pattern determining unit 32b. The padding pattern determining unit 32b determines the padding patterns of the lower page and the upper page based on a page determination result notified from the page determining unit 33 and a set of the compression rate range signals CRR1 and CRRu.

Similarly to the first embodiment, in a case where the compression rate CR1 is divided using three ways of Conditions 4 to 6, and the compression rate CRu is divided using three ways of Conditions 1 to 3, there are nine sets of the compression rates CR1 and CRu, and a padding pattern is selected from among a maximum of nine padding patterns.

FIGS. 14A to 14C are diagrams that illustrate some padding patterns of the nine padding patterns. FIG. 14A illustrates Pattern A1 in a case where the compression rate CRu is under Condition 2, and the compression rate CR1 is under Condition 4, FIG. 14B illustrates Pattern A2 in a case where the compression rate CRu is under Condition 2, and the compression rate CR1 is under Condition 5, and FIG. 14C illustrates Pattern A3 in a case where the compression rate CRu is under Condition 2, and the compression rate CR1 is under Condition 6. Each of the patterns illustrated in FIGS. 14A to 14C has padding patterns of an upper page and a lower page.

In Pattern A1 illustrated in FIG. 14A, the padding pattern of the upper page has a period of four bits, and padding data "0" is added to the (0+4i)-th cell in the padding pattern. In addition, the padding pattern of the lower page has a period of four bits, and padding data "1" is added to (1+4i)-th and (2+4i)-th cells in the padding pattern. In this Pattern A1, the rate of the appearance of the distribution C is 25%. In this Pattern A1, there is no possibility of the appearance of E-C-E or C-E-C.

In Pattern A2 illustrated in FIG. 14B, the padding pattern of the upper page has a period of eight bits, and padding data "0" is added to (1+8i)-th and (6+8i)-th cells in the padding pattern. In addition, the padding pattern of the lower page has a period of eight bits, and padding data "1" is added to (3+8i)-th and (4+8i)-th cells in the padding pattern. In this Pattern A2, the rate of the appearance of the distribution C is 50%. In this Pattern A2, there is no possibility of the appearance of E-C-E or C-E-C.

In Pattern A3 illustrated in FIG. 14C, the padding pattern of the upper page has a period of 20 bits, and padding data "0" is added to (0+20i)-th, (3+20i)-th, (9+20i)-th, (14+20i)-th, and (17+20i)-th cells in the padding pattern. In addition, the padding pattern of the lower page has a period of 20 bits, and padding data "1" is added to (6+20i)-th, (7+20i)-th, (11+20i), and (12+20i)-th cells in the padding pattern. In this Pattern A3, the rate of the appearance of the distribution C is 55%. In this Pattern A3, there is a possibility of the appearance of E-C-E only in one bit (the (5+20i)-th cell) among the 20 bits.

Figure 15:
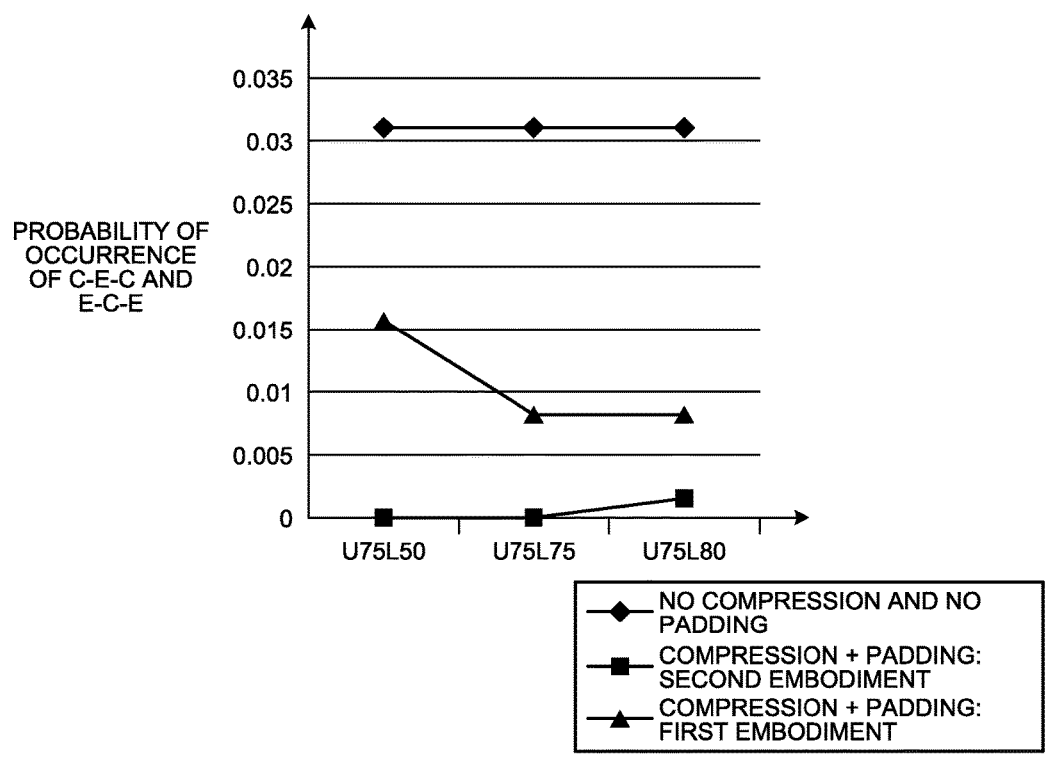
FIG. 15 is a diagram that illustrates an example of an occurrence probability of C-E-C or E-C-E when a padding process according to the first embodiment is performed and an example of an occurrence probability of C-E-C or E-C-E when a padding process according to the second embodiment is performed.

FIG. 15 is a diagram that illustrates the probabilities of the occurrence of C-E-C or E-C-E according to a technique (no compression and no padding) of a comparative example, the technique of the first embodiment, and the technique of the second embodiment. Left plots illustrate states in case of Condition 2 and Condition 4 and correspond to FIGS. 9A and 14A. Middle plots illustrate states in case of Condition 2 and Condition 5 and correspond to FIGS. 9B and 14B. Right plots illustrate states in case of Condition 2 and Condition 6 and correspond to FIGS. 9C and 14C.

In the case of the left plot, in the first embodiment, while there is a possibility of the occurrence of E-C-E, in the second embodiment, there is no possibility of the occurrences of both E-C-E and C-E-C. In the case of the middle plot, in the first embodiment, while there is a possibility of the occurrence of E-C-E, in the second embodiment, there is no possibility of the occurrences of both E-C-E and C-E-C. In the case of the right plot %, while there is a possibility of the appearance of E-C-E also in the second embodiment, the probability of the appearance of E-C-E or C-E-C is lower in the second embodiment than in the first embodiment.

The padding unit 50 performs a padding process for the data of the lower page or the upper page buffered in the compressed data buffer 47 based on the compression rate range signals CRR1 and CRRu notified from the compression unit 31, the padding pattern information PPDt notified from the padding pattern determining unit 32b, and the erase count notified from the meta data management unit 39. The padding unit 50 adds a PPID of four bits used for identifying one of the nine padding patterns to the start of the compressed data PdData and outputs resultant compressed data to the output unit 35.

The padding data removing unit 45 determines whether or not the read target page is an upper page or a lower page based on a result of the determination acquired by the page determining unit 33, reads the PPID from the first four bits of the read data, and determines a used padding pattern. The padding data removing unit 45 determines a correspondence relation between the padding pattern and a cell number based on an erase count. The padding data removing unit 45 removes first four bits corresponding to the PPID from the read data input from the input unit 41. Next, the padding data removing unit 45 determines an arrangement relation between the compressed data CpData and the padding data based on the determined padding pattern and the determined correspondence relation between the padding pattern and the cell number and removes the padding data from the read data from which the first four bits have been removed based on the determination. The padding data removing unit outputs the read data from which the first four bits and the padding data have been removed to the decompression unit 46.

The operation sequence of the memory system 100 performed when a write request or a read request is received from the host 1 is similar to that according to the first embodiment.

In this way, according to the second embodiment, the padding pattern of each page is determined based on a set of the compression rates of a plurality of pages assigned to a same physical sector. For this reason, gargled data according to interferences between cells is further reduced.

In addition, in the second embodiment, while the PPID used for identifying the padding pattern is added to the page data stored in the NAND 10, the PPID may be configured to be managed using a meta data table of the meta data management unit 39. In addition, also when uncompressed write data is stored in the NAND 10, the PPID may be added to the write data.

Third Embodiment

In a third embodiment, in a write process performed when a write request is received from a host, the compression process and the padding process described above are not performed, but the compression process and the padding process described above are performed when a write process is performed at the time of performing garbage collection.

Figure 16:
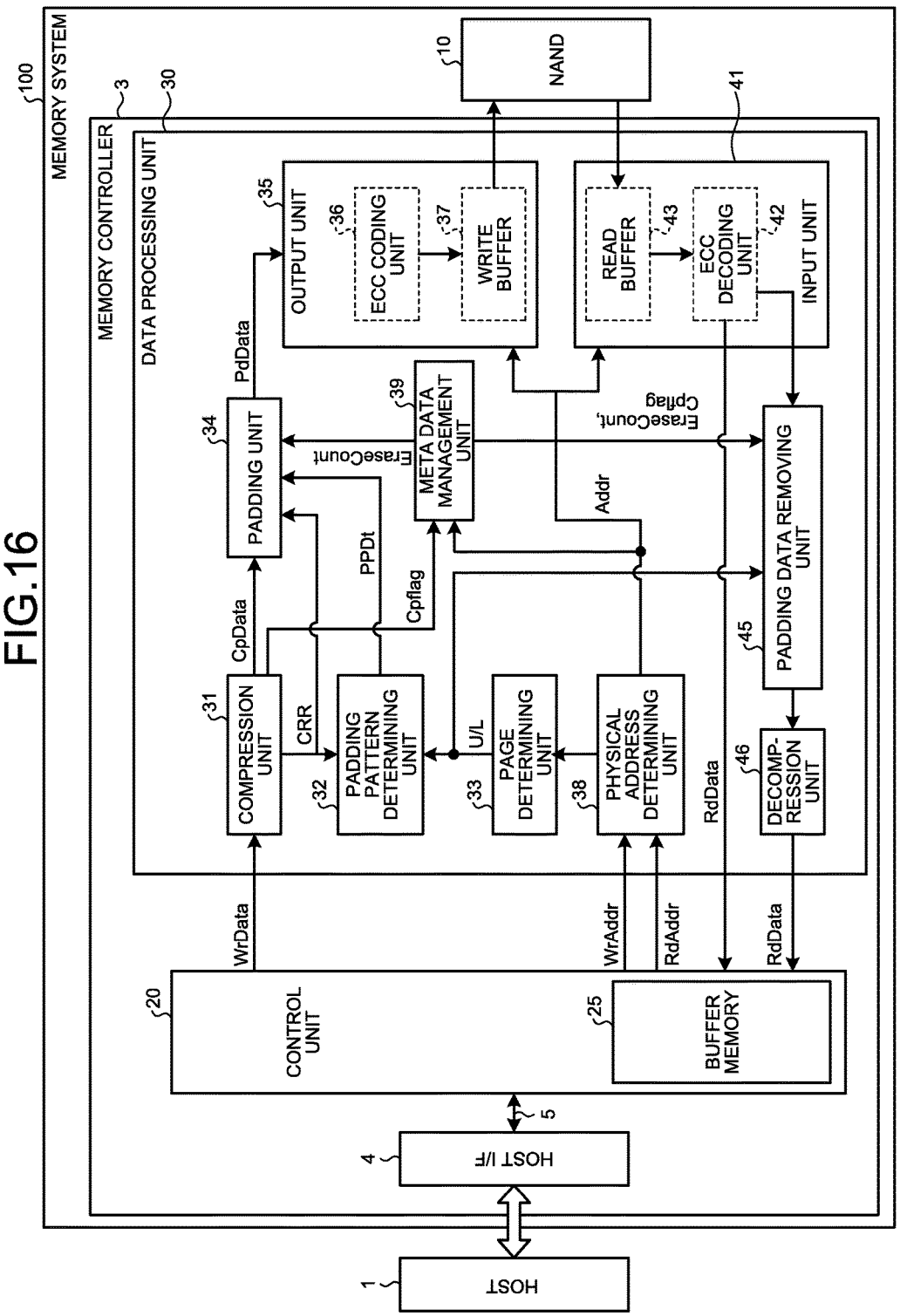
FIG. 16 is a functional block diagram that illustrates an example of the internal configuration of a memory system according to a third embodiment.

FIG. 16 is a block diagram that illustrates an example of the configuration of a memory system 100 according to a third embodiment. In FIG. 16, a same reference numeral is assigned to a constituent element achieving the same function as that of the memory system 100 illustrated in FIG. 1, and duplicate description will not be presented. In the case illustrated in FIG. 16, a line through which read data RdData is directly input from an ECC decoding unit 42 to a control unit 20 is added to the configuration illustrated in FIG. 1.

The control unit 20 controls garbage collection (compaction). In the memory system 100, in a case where a unit (block) for erasing data and a unit for reading/writing data are different from each other, when the rewriting of data into the NAND 10 progresses, blocks are fragmented according to invalid data. When the number of such fragmented blocks increases, the number of usable blocks decreases. Thus, for example, in a case where the number of free blocks of the NAND 10 is less than a certain threshold, garbage collection (compaction) is performed, whereby the number of free blocks is increased. In the garbage collection (hereinafter, abbreviated to GC), from a block including valid data and invalid data, the valid data is collected and is rewritten into another block.

Figure 17:
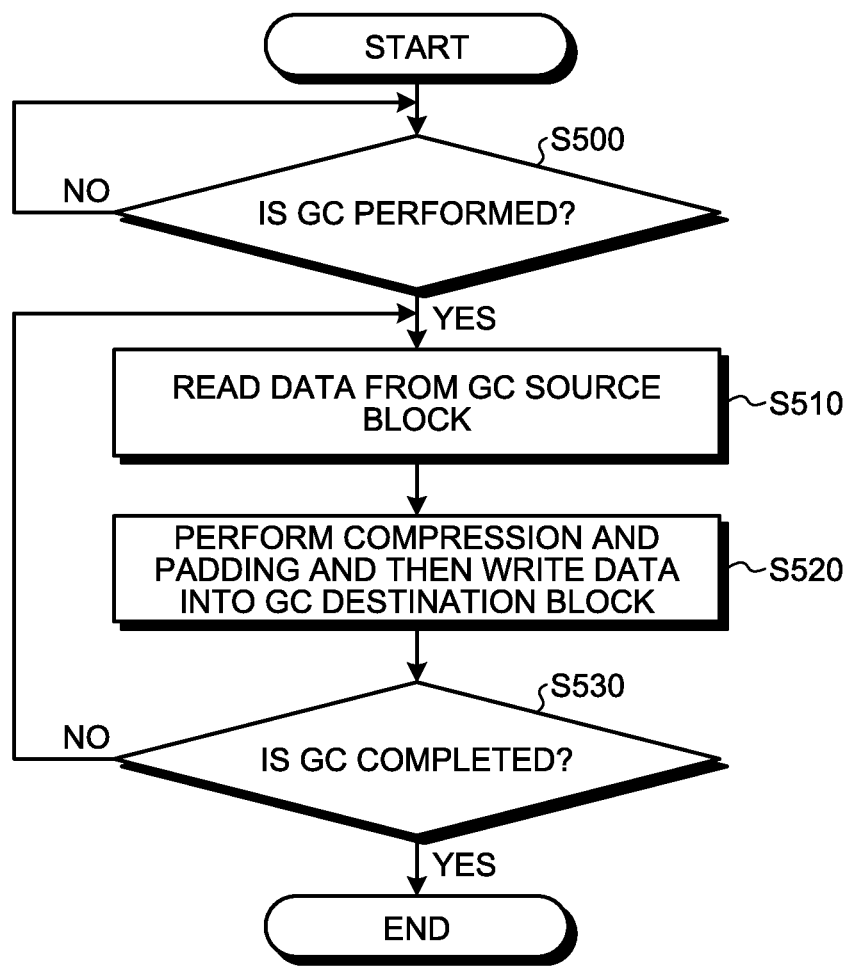
FIG. 17 is a flowchart that illustrates an example of the operation sequence of the memory system according to the third embodiment applied when data is written.

Hereinafter, an example of the operation of the memory system 100 according to the third embodiment will be described with reference to a flowchart illustrated in FIG. 17. For example, in a case where a GC execution condition such as a condition that the number of free blocks is less than a certain threshold value is satisfied (S500), the control unit 20 searches for GC target data. The control unit 20 inputs a read address RdAddr at which the found GC target data is stored to a data processing unit 30 and causes the GC target data to be read from the NAND 10. The input unit 41 outputs the read GC target data to the control unit 20 (S510). The GC target data is buffered in the buffer memory 25.

The control unit 20 inputs a write address WrAddr included in a GC destination block storing the GC target data to the data processing unit 30. The GC destination block, for example, is selected from among the free blocks described above. In addition, the control unit 20 inputs the GC target data of the buffer memory 25 to the data processing unit 30 as write data WrData. Accordingly, a write processing unit configured by a compression unit 31, a padding pattern determining unit 32, a page determining unit 33, a padding unit 34, and an output unit 35 performs the compression process and the padding process described above and writes the GC target data into a free block of the NAND 10 (S520). The control unit 20 determines whether or not the GC has been completed (S530) and performs such a process until the GC is completed in a case where the GC has not been completed.

In this way, according to the third embodiment, when garbage collection is performed, the compression process and the padding process are performed for the data. For this reason, a delay of the write process at the time of receiving a write request from a host can be prevented.

In the first to third embodiments described above, while a case has been described in which a recording operation is performed using the MLC mode, the control process described in the first to third embodiments may be applied to a NAND 10 performing a recording operation of a TLC mode or a QLC mode. In the case of the TLC mode, three pages including a lower page, a middle page, and an upper page are assigned to a same physical sector. In a case where the first embodiment is applied to the TLC mode, the padding pattern of the lower page is determined based on the compression rate of lower page data, the padding pattern of the middle page is determined based on the compression rate of middle page data, and the padding pattern of the upper page is determined based on the compression rate of upper page data. In a case where the second embodiment is applied to the TLC mode, the padding pattern of each page is determined based on a set of the data compression rates of the lower page, the middle page, and the upper page. In addition, in the case of the QLC mode, four pages including a lower page, an upper page, a higher page, and a top page are assigned to a same physical sector. In a case where the first embodiment is applied to the QLC mode, the padding pattern of the lower page is determined based on the compression rate of lower page data, the padding pattern of the upper page is determined based on the compression rate of upper page data, the padding pattern of the higher page is determined based on the compression rate of higher page data, and the padding pattern of the top page is determined based on the compression rate of top page data. In a case where the second embodiment is applied to the QLC mode, the padding pattern of each page is determined based on a set of the data compression rates of the lower page, the upper page, the higher page, and the top page.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller controlling a nonvolatile memory having a plurality of physical sectors, each of the physical sectors including memory cells, each of the memory cells being capable of storing data of m bits using threshold voltage distributions of the m-th power of two, each of the physical sectors storing data of m pages, m being a natural number of two or more; the memory controller comprising:

a compression unit that generates first compressed data and second compressed data by compressing first data and second data;

a padding processing unit that pads first padding data for the first compressed data in accordance with a first padding pattern and pads second padding data for the second compressed data in accordance with a second padding pattern, the first padding pattern being determined based on at least a compression rate of the first data, the second padding pattern being determined based on at least a compression rate of the second data; and an output unit that writes the padding-processed first compressed data into a first page of the nonvolatile memory and writes the padding-processed second compressed data into a second page of the nonvolatile memory, the first page and the second page being pages different from each other.

2. The memory controller according to claim 1, wherein the padding processing unit selects the first padding pattern from among a plurality of padding patterns based on the compression rate of the first data and selects the second padding pattern from among the plurality of padding patterns based on the compression rate of the second data.

3. The memory controller according to claim 1, wherein the padding processing unit selects the first padding pattern from among a plurality of padding patterns based on the compression rates of the first data and the second data and selects the second padding pattern from among the plurality of padding patterns based on the compression rates of the first data and the second data.

4. The memory controller according to claim 1, wherein the padding processing unit pads the first padding data for the first compressed data in a distributed manner and pads the second padding data for the second compressed data in a distributed manner.

5. The memory controller according to claim 1, wherein the padding processing unit shifts the first padding pattern based on the number of times of erasing the first page and shifts the second padding pattern based on the number of times of erasing the second page.

6. The memory controller according to claim 1, wherein the padding processing unit adds information used for identifying the first padding pattern to the first compressed data and adds information used for identifying the second padding pattern to the second compressed data.

7. The memory controller according to claim 1, wherein the first data and the second data are target data for garbage collection.

8. The memory controller according to claim 1, further comprising:
an input unit that reads data from the nonvolatile memory; and
a reverse padding processing unit that removes the first padding data from the read data in a case where the read data is stored in the first page and removes the second padding data from the read data in a case where the read data is stored in the second page; and
a decompression unit that decompresses the data from which the first padding data is removed and decompresses the data from which the second padding data is removed.

9. A method of controlling a nonvolatile memory controlling the nonvolatile memory having a plurality of physical sectors, each of the physical sectors including memory cells, each of the memory cells being capable of storing data of m bits using threshold voltage distributions of the m-th power of two, each of the physical sectors storing data of m pages, m being a natural number of two or more, the method comprising:
generating first compressed data and second compressed data by compressing first data and second data;
padding first padding data for the first compressed data in accordance with a first padding pattern and padding second padding data for the second compressed data in accordance with a second padding pattern, the first padding pattern being determined based on at least a compression rate of the first data, the second padding pattern being determined based on at least a compression rate of the second data; and
writing the padding-processed first compressed data into a first page of the nonvolatile memory and writing the padding-processed second compressed data into a second page of the nonvolatile memory, the first page and the second page being pages different from each other.

10. The method of controlling the nonvolatile memory according to claim 9, wherein the padding of the first padding data and the second padding data includes:
selecting the first padding pattern from among a plurality of padding patterns based on the compression rate of the first data; and
selecting the second padding pattern from among the plurality of padding patterns based on the compression rate of the second data.

11. The method of controlling the nonvolatile memory according to claim 9, wherein the padding of the first padding data and the second padding data includes:
selecting the first padding pattern from among a plurality of padding patterns based on the compression rates of the first data and the second data; and
selecting the second padding pattern from among the plurality of padding patterns based on the compression rates of the first data and the second data.

12. The method of controlling the nonvolatile memory according to claim 9, wherein the padding of the first padding data and the second padding data includes:
padding the first padding data for the first compressed data in a distributed manner; and
padding the second padding data for the second compressed data in a distributed manner.

13. The method of controlling the nonvolatile memory according to claim 9, wherein the padding of the first padding data and the second padding data includes:
shifting the first padding pattern based on the number of times of erasing the first page; and
shifting the second padding pattern based on the number of times of erasing the second page.

14. The method of controlling the nonvolatile memory according to claim 9, further comprising: adding information used for identifying the first padding pattern to the first compressed data and adding information used for identifying the second padding pattern to the second compressed data.

15. The method of controlling the nonvolatile memory according to claim 9, wherein the first data and the second data are target data for garbage collection.

16. The method of controlling the nonvolatile memory according to claim 9, further comprising:
reading data from the nonvolatile memory;
removing the first padding data from the read data in a case where the read data is stored in the first page and removing the second padding data from the read data in a case where the read data is stored in the second page; and
decompressing the data from which the first padding data is removed and decompressing the data from which the second padding data is removed.

17. A memory system comprising:
a nonvolatile memory that has a plurality of physical sectors, each of the physical sectors including memory cells, each of the memory cells being capable of storing data of m bits using threshold voltage distributions of the m-th power of two, each of the physical sectors storing data of m pages, m being a natural number of two or more; and
a controller that includes:
a compression unit that generates first compressed data and second compressed data by compressing first data and second data;
a padding processing unit that pads first padding data for the first compressed data in accordance with a first padding pattern and pads second padding data for the second compressed data in accordance with a second padding pattern, the first padding pattern being determined based on at least a compression rate of the first data, the second padding pattern being determined based on at least a compression rate of the second data; and an output unit that writes the padding-processed first compressed data into a first page of the nonvolatile memory and writes the padding-processed second compressed data into a second page of the nonvolatile memory, the first page and the second page being pages different from each other.

18. The memory system according to claim 17, wherein the padding processing unit selects the first padding pattern from among a plurality of padding patterns based on the compression rate of the first data and selects the second padding pattern from among the plurality of padding patterns based on the compression rate of the second data.

19. The memory system according to claim 17, wherein the padding processing unit selects the first padding pattern from among a plurality of padding patterns based on the compression rates of the first data and the second data and selects the second padding pattern from among the plurality of padding patterns based on the compression rates of the first data and the second data.

20. The memory system according to claim 17, wherein the padding processing unit pads the first padding data for the first compressed data in a distributed manner and pads the second padding data for the second compressed data in a distributed manner.

* * * * *